United States Patent
Bourbonnais et al.

(10) Patent No.: US 11,157,518 B2
(45) Date of Patent: *Oct. 26, 2021

(54) REPLICATION GROUP PARTITIONING

(71) Applicant: INTERNATIONAL BUSINESS MACHINES CORPORATION, Armonk, NY (US)

(72) Inventors: Serge Bourbonnais, Palo Alto, CA (US); You-Chin Fuh, San Jose, CA (US); Yi Jin, Beijing (CN); Xiao Li, San Jose, CA (US); Hong Min, Poughkeepsie, NY (US); Miao Zheng, Beijing (CN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 700 days.

This patent is subject to a terminal disclaimer.

(21) Appl. No.: 13/969,249

(22) Filed: Aug. 16, 2013

(65) Prior Publication Data

US 2014/0279892 A1 Sep. 18, 2014

Related U.S. Application Data

(63) Continuation of application No. 13/800,139, filed on Mar. 13, 2013.

(51) Int. Cl.
*G06F 16/27* (2019.01)

(52) U.S. Cl.
CPC .................. *G06F 16/278* (2019.01)

(58) Field of Classification Search
CPC ........... H04L 29/08882; G06F 11/1471; G06F 11/1666

USPC .......................................... 707/633
See application file for complete search history.

(56) References Cited

U.S. PATENT DOCUMENTS

| | | | | |
|---|---|---|---|---|
| 7,096,469 B1* | 8/2006 | Kubala | ................. | G06F 9/5077 718/100 |
| 7,187,769 B1* | 3/2007 | Moriai | ................... | H04L 9/002 380/1 |
| 8,527,473 B1* | 9/2013 | Brown et al. | ................. | 707/682 |
| 8,676,753 B2* | 3/2014 | Sivasubramanian et al. | | 707/614 |
| 9,489,434 B1* | 11/2016 | Rath | ................. | G06F 17/30557 |
| 2002/0152305 A1* | 10/2002 | Jackson | ............. | H04L 41/5035 709/224 |

(Continued)

OTHER PUBLICATIONS

Curino, C., et al. "Schism: A Workload-Driven Approach to Database Replication and Partitioning" Proceedings of the VLDB Endowment, vol. 3, No. 1. Sep. 2010. (10 Pages).

(Continued)

*Primary Examiner* — Hanh B Thai
(74) *Attorney, Agent, or Firm* — Tutunjian & Bitetto, P.C.; Anthony Curro

(57) ABSTRACT

Systems for replication group partitioning include a workload profiling module configured to analyze historical workload data for a plurality of data elements to identify and categorize one or more transaction patterns; and a recommendation module configured to generate a recommended partitioning of the plurality of data elements into one or more replication groups, based on the one or more transaction patterns, that are optimized toward a partitioning goal.

9 Claims, 4 Drawing Sheets

(56) References Cited

U.S. PATENT DOCUMENTS

| | | | |
|---|---|---|---|
| 2005/0240932 A1* | 10/2005 | Billau | G06F 9/5072 |
| | | | 718/104 |
| 2006/0265756 A1* | 11/2006 | Campbell | G06F 21/50 |
| | | | 726/26 |
| 2007/0061379 A1* | 3/2007 | Wong | G06F 17/30575 |
| 2008/0155310 A1* | 6/2008 | Langen | G06F 11/2028 |
| | | | 714/6.12 |
| 2008/0229031 A1* | 9/2008 | Villarreal | G06F 9/5077 |
| | | | 711/153 |
| 2008/0263001 A1 | 10/2008 | Lohman et al. | |
| 2009/0019158 A1* | 1/2009 | Langen | H04L 67/1095 |
| | | | 709/226 |
| 2009/0157777 A1 | 6/2009 | Golwalkar et al. | |
| 2009/0287703 A1* | 11/2009 | Furuya | G06F 17/30353 |
| 2010/0082540 A1 | 4/2010 | Isaacson et al. | |
| 2010/0280882 A1* | 11/2010 | Faith | G06Q 10/06375 |
| | | | 705/7.37 |
| 2011/0145657 A1* | 6/2011 | Bishop | G06F 11/3495 |
| | | | 714/47.1 |
| 2011/0191461 A1* | 8/2011 | Dasgupta | G06F 15/173 |
| | | | 709/224 |
| 2012/0117065 A1 | 5/2012 | Nehme et al. | |
| 2012/0303791 A1* | 11/2012 | Calder et al. | 709/224 |
| 2012/0311295 A1* | 12/2012 | Gaur | G06F 9/5072 |
| | | | 711/173 |
| 2014/0181545 A1* | 6/2014 | Shrall | G06F 1/3206 |
| | | | 713/320 |

OTHER PUBLICATIONS

Moiz, S., et al. "Database Replication: A Survey of Open Source and Commercial Tools" International Journal of Computer Applications, vol. 13, No. 6. Jan. 2011. pp. 1-8.

* cited by examiner

REPLICATION GROUP PARTITIONING

RELATED APPLICATION INFORMATION

This application is a Continuation application of co-pending U.S. patent application Ser. No. 13/800,139 filed on Mar. 13, 2013, incorporated herein by reference in its entirety.

BACKGROUND

Technical Field

The present invention relates to database replication and, more particularly, to partitioning a database into consistency groups for replication.

Description of the Related Art

Some businesses have stringent disaster-recovery requirements for mission-critical systems. Such a system may have a redundantly active data center located at a distant site. In a failover model, changes in one data center are mirrored to one or more backup or query-only data centers. In a near continuous availability model, data is synchronized across multiple active data centers. A software-based solution allows for unlimited distance replication with only seconds of user impact in case of a site disaster.

One solution to this is to replicate data changes from a first site in a second site. The first site captures changes as they occur and forwards those changes to the second site. The second site then reproduces the changes to its own databases. This replication can be bi-directional if both data centers are receiving workloads.

High-volume replications necessitate a scalable solution. In one realistic scenario, a system may accommodate over 400,000,000 customers with batch workloads of over 500,000 log rows per second. These figures are increasing dramatically with each passing year. Parallelism aids in scaling to meet demand, but such scaling still has limits if the changes' reproduction cannot be parallelized in multiple separate logical or physical hardware partitions.

SUMMARY

A method for replication group partitioning includes analyzing historical workload data for a plurality of data elements with a processor to identify and categorize one or more transaction patterns; and generating a recommended partitioning of the plurality of data elements into one or more replication groups, based on the one or more transaction patterns, that are optimized toward a partitioning goal.

A system for replication group partitioning includes a workload profiling module configured to analyze historical workload data for a plurality of data elements to identify and categorize one or more transaction patterns; and a recommendation module comprising a processor configured to generate a recommended partitioning of the plurality of data elements into one or more replication groups, based on the one or more transaction patterns, that are optimized toward a partitioning goal.

A method for grouped data replication includes analyzing historical workload data for a plurality of data elements with a processor to identify and categorize one or more transaction patterns; generating a recommended partitioning of the plurality of data elements into one or more replication groups, based on the one or more transaction patterns, that are optimized toward a partitioning goal; logging transactions that involve the plurality of data elements in a first data center; replicating the logged transactions in a second data center, where the replicated transactions are grouped according to the recommended partitioning; monitoring online workload changes; and generating a new recommended partitioning based on said online workload changes to maintain an optimized partitioning goal.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles provide for parallelization of multi-site data center workload replications across multiple consistency groups. Each consistency group may be replicated in a separate logical or physical hardware partition. Database transactions that change tables assigned to different consistency groups will be broken up and replayed at the target as independent partial transactions. This operates with eventual consistency, where transaction consistency is restored when all table changes are replicated up to a common point in time.

Because manual partitioning of large datasets is impractical, the present principles semi-automatically partition the datasets. The present principles take into account the data sources' internal coupling, e.g. via transaction scopes, and variations in data change volumes among data objects at different workload peaks to provide recommendations for group partitioning. The goals of this analysis include grouping at data object boundaries, such that a given object (such as a table, table partition, etc.) belongs to one and only one replication group, balancing data change volumes between different groups, minimizing the number of transactions impacted by separating data objects into different replication groups, and protecting a desired level of transaction consistency. Some embodiments of the present principles also provide dynamic partitioning, with online changes to consistency groups.

Figure 1:
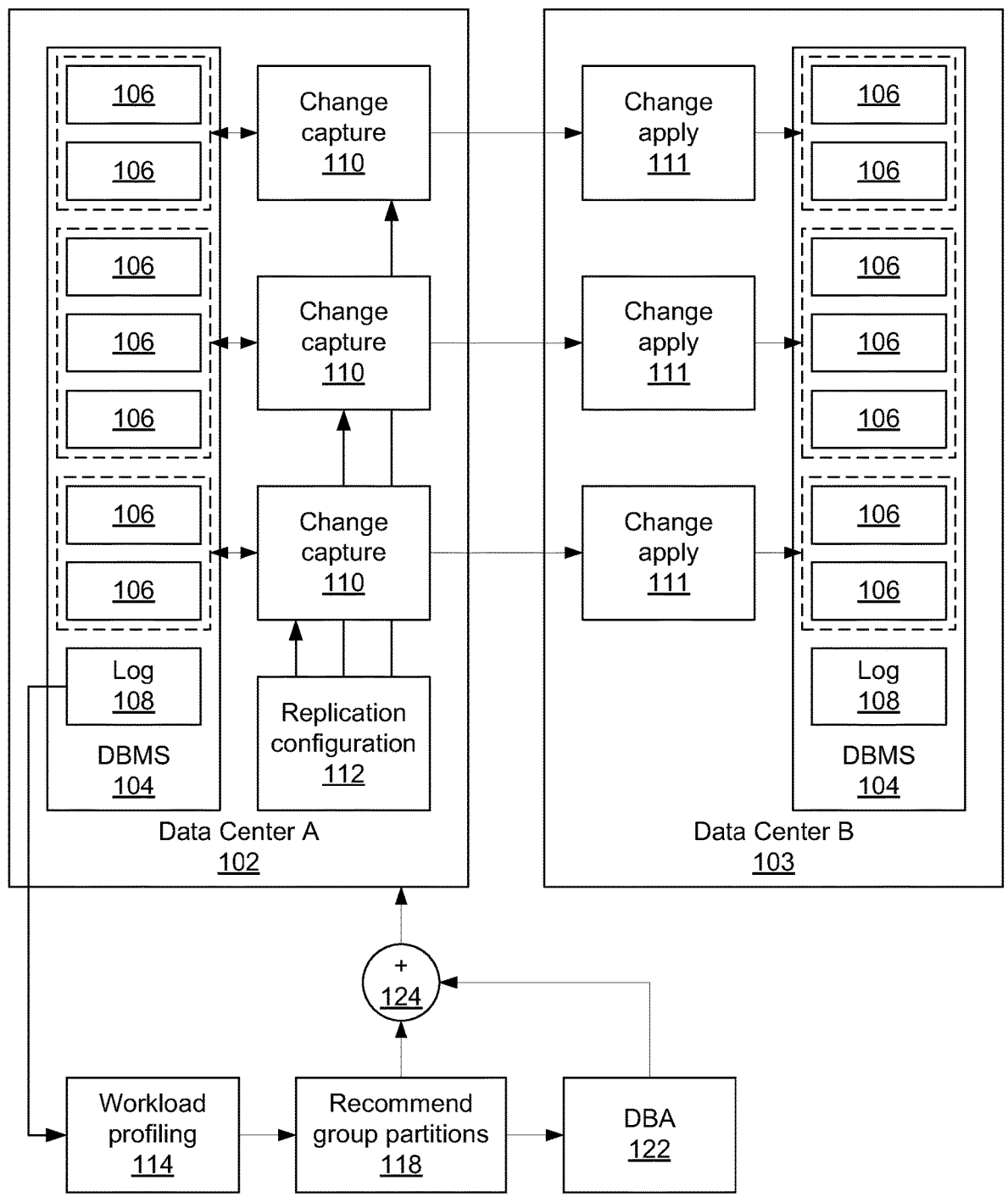
FIG. 1 is a diagram of data center replication with consistency groups in accordance with the present principles.

Referring now to the drawings in which like numerals represent the same or similar elements and initially to FIG. 1, a data replication system is shown with semi-automatic consistency group partitioning. A first data center A 102 replicates its data to a second data center B 103, where the second data center 103 is preferably located far away from the first data center A 102. The data centers include a database management system (DBMS) 104 that includes a set of data elements 106. The data elements 106 may represent individual databases, tables within a database, table partitions, or any other appropriate grouping of data.

Change capture modules 110 each monitor a set of data elements 106. The change capture modules 110 obtain information regarding changes in the data elements 106 by, e.g., monitoring a change log 108 or by monitoring database calls directly, or by collecting real time statistics changes of a database. Types of logged changes may include, e.g., insertions, updates, and deletions of volumes by a number of bytes, database schema changes, or insertions, updates, and deletions of row counts. The change capture modules 110 access replication configuration 112 to determine what sets of data elements 106 to use and may also include configuration options relating to the speed and timing of replication.

The second data center B 103 receives information from the first server's change capture modules 110. This information may be transferred by any appropriate means. In one exemplary embodiment the information is transmitted over a wide area network (e.g., the Internet), but it is also contemplated that a local area network may be used. The change apply modules 111 at the second data center B 103 receive and play back changes made to the data elements 106 in the first data center A 102, such that the data elements 106 of the second data center's DBMS 104 track the changes made to the original data elements 106.

As described above, the manual grouping of data elements 106 into consistency groups may be impractical, particularly over large datasets. Instead of purely manual grouping, the present principles provide grouping recommendations based on actual workloads and capabilities. This allows data replication to be conducted in a relatively even-handed way across data elements 106, without concentrating too many workloads on any one consistency group. The workload information is stored in log 108 and characterizes the usage of data elements by, e.g., number of transactions per second, transaction sizes, etc.

A workload profiling module 114 accesses the logged information and generates an analysis, noting for example which data elements 106 have high workloads. The workload profiling module 114 gathers statistics for each transaction from the database log 108 and generates a summary based on transaction patterns, where each transaction pattern corresponds to a particular group of transactions that updates the same data elements 106. A transaction pattern may include one or more of: 1) which data elements 106 are updated by the pattern; 2) how many transactions conform to this pattern; 3) the statistics values of transaction sizes (e.g., minimum, maximum, average and median); 4) the statistics values of transaction execution times (e.g., minimum and maximum); 5) the element-specific statistics in this transaction pattern (e.g., the numbers of Update/Delete/Insert rows, the total data volumes of Update/Delete/Insert operations); and 6) the replication-dependent statistics in this transaction pattern (e.g., the total data volumes that are transferred to the target side for replicating one type of operations, Update/Delete/Insert). These transaction pattern characteristics are generated for the transactions that are committed in a specific interval and, thus, the workload profiling module 114 also records the starting time point and ending time point. After collecting the statistics of multiple continuous intervals, the peak throughput can be determined for each transaction pattern. It can also be determined whether one table is heavily involved in a specific interval if a large number of committed transactions involve this table.

Exemplary analyses performed by the workload profiling module 114 include determining peak throughput, total throughput, and transaction affinity and distribution. The workload profiling module 114 can also track data element workloads according to, e.g., time of day. In this manner, data elements with complementary high-load times can be matched into consistency groups. The behavior of the workload profiling module 114 can be configured by a database administrator to set such values as target data elements and capture time ranges. Multiple workload profiles may be captured over different workload periods (e.g., online versus batch).

Recommendation module 118 further analyzes the workloads and provides recommendations for consistency group partitions based on one or more analyzed workload profiles. The recommendation module 118 may also make use of enforced groupings specified by users and other database statistics. The workload is modeled by some data structures, for example a graph or set. The recommendations may be formed based on exhaustive or heuristics-based methods, where exhaustive methods are more appropriate for workloads having a small number of tables, or for a small number of tables having heavy workloads.

In one exemplary embodiment, where workloads are modeled as a graph, each node in a workload graph denotes a data element 106 and each edge that connects two nodes denotes that there are transactions that involve the connected elements 106, where a labeled weight on an edge indicates the number of transactions that involve connected tables. In an alternative embodiment, where workloads are modeled as sets, each element of the set corresponds to a particular workload pattern.

Grouping is done along data element boundaries, such that a given data element 106 belongs to one and only one replication group. Recommendation module 118 attempts to balance data change volumes as evenly as possible, using the analysis provided by workflow profiling module 114. The recommendation module 118 also attempts to minimize the number of transactions that are impacted by separating data elements 106 into different replication groups. In other words, if two data elements have mutual dependencies, then the recommendation module 118 will attempt to group them together. This avoids a situation where such data elements 106 come out of sync. Recommendations may be built iteratively or recursively. For workloads with large numbers of tables, top-heavy tables may be grouped first, with subsequent groups being formed based on the outcome of the first grouping. Each iteration may be made exhaustive or heuristics-based, and each step may focus on one or more different objectives. The recommendation module 118 may output multiple different recommendations for selection.

A database administrator 122 reviews the recommended group partitions and makes any alterations that may be appropriate. The administrator 122 combines their changes with the group partition recommendations at 124, and these new partitions are used in the first data center A 102 to change the replication configuration 112 to guide the change capture modules 110 going forward. It should be recognized that the present principles may be implemented fully automatically, without any supervision by the administrator 122.

The database administrator 122 sets out a preferred grouping. For example, there may be preferred affinities or separations between data elements, where given tables should be grouped together or apart from one another. The administrator 122 may also set grouping objectives to be used in forming the recommendations at 118. Such goals may include, e.g., total throughput balance, peak balance, and the maintenance of specified transaction affinities. The administrator 122 may also configure the groups' total or peak allowed throughput and the characteristics that determine whether a given data element 106 is "heavy", having a large workload size.

Figure 2:
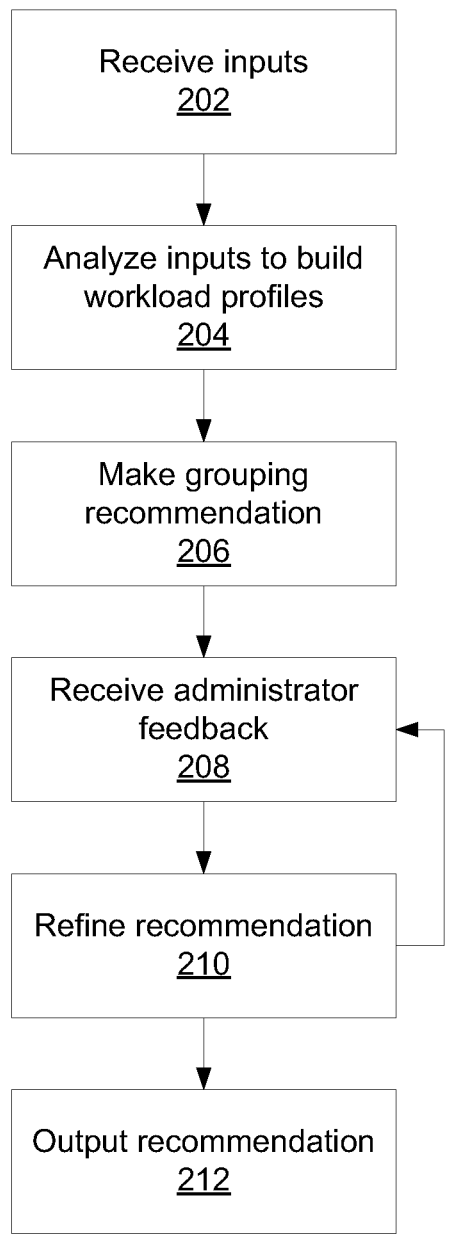
FIG. 2 is a block/flow diagram of data center replication with consistency groups in accordance with the present principles.

Referring now to FIG. 2, a method for forming consistency group recommendations is shown. Block 202 receives a set of inputs that may include, for example, log data that describes data changes (including data update volume and transaction scope), direct data change information (including, e.g., data change type and location), data statistics, real-time statistics, replication throughput per hardware partition, user configurations that pertain to preferred groupings (including affinities and separations), grouping objectives, and user-specified thresholds.

Block 204 uses the inputs provided by block 202 to analyze workloads. This analysis provides a workload summary that may include peak throughput, total throughput, transaction affinity, and distribution. In particular, the analysis identifies busy data elements 106 and their workload characteristics. Block 204 generates one or more workload profiles to characterize the tasks being performed on data elements 106.

Block 206 uses these profiles to make grouping recommendations. The recommendations may be based on some or all of the available inputs and may be formed using one or more objectives, by one or more grouping methods, in one or more steps. The recommendations may be ranked based on one or more objectives. The objectives for grouping may include, e.g., keeping tables having transaction affinity within the same group, minimizing the peak throughput of groups, and evenly distributing resources between groups. As noted above, these objectives can be pursued using an exhaustive search or by heuristics-based methods. For example, variants of best-first search and depth-first search are applicable. An exhaustive search is more appropriate for smaller numbers of data elements 106. The recommendations may further be generated in a single optimization or may instead be formed iteratively. One example of such an iterative process would be to group top-heavy tables first and group progressively smaller tables until no data elements 106 remain. In the exhaustive search, the pruning algorithms can be used to reduce the search space. The exhaustive search can be used to group top-heavy tables or combined with the other heuristics-based method.

Sometimes the objectives of balancing data change volumes and minimize transaction split may contradict each other in terms of which group a table should be placed in. Another similar case arises when making recommendations for balancing a groups' peak and for balancing a groups' total might generate conflicting results. Recommendation module 118 follows a user-specified or default priority order to resolve conflicts between optimization objectives.

Block 208 presents the recommendations to a database administrator 122 for feedback. The administrator 122 can accept, deny, or change recommendations, and can select between recommendations if more than one is supplied. The administrator 122 can also tweak objectives and other inputs, prompting a refinement in the recommendation at block 210. This refined recommendation is provided to the administrator 122 again at block 208. When the administrator 122 has no further changes, block 212 outputs the final recommendation to, e.g., replication configuration 112.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 3:
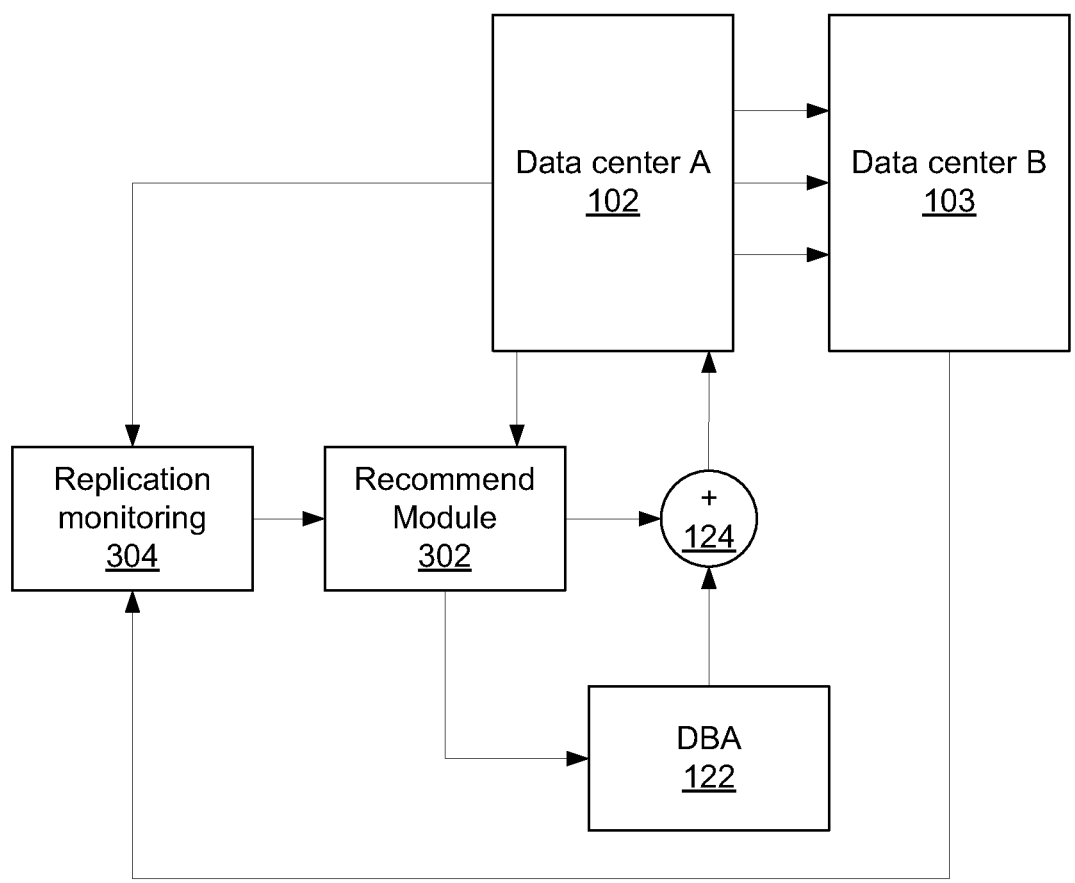
FIG. 3 is a diagram of data center replication with consistency groups and online replication monitoring in accordance with the present principles.

Referring now to FIG. 3, another embodiment of a data replication system is shown with dynamic repartitioning. As above, data center A 102 replicates to data center B 103, splitting its replication between multiple consistency groups. A recommend module 302 performs the functions of the workload profiling module 114 and partition recommendation module 118 described above. The database administrator 122 reviews recommendations made by the recommendation module 302 and optionally alters them at 124.

A replication monitoring module 304 receives online updates from data centers 102 and 103. The replication monitoring module 304 continues to monitor workloads at data center A 102 and replication behavior at data center B 103 and updates workload profiles. The replication monitoring module 304 captures fluctuations in workloads and allows for rapid adaptation to new workload balances. Toward this end, the replication monitoring module 304 may issue warnings to administrator 122 or advise adjustments to the recommendations at recommendation module 302 to accommodate the new system conditions.

Figure 4:
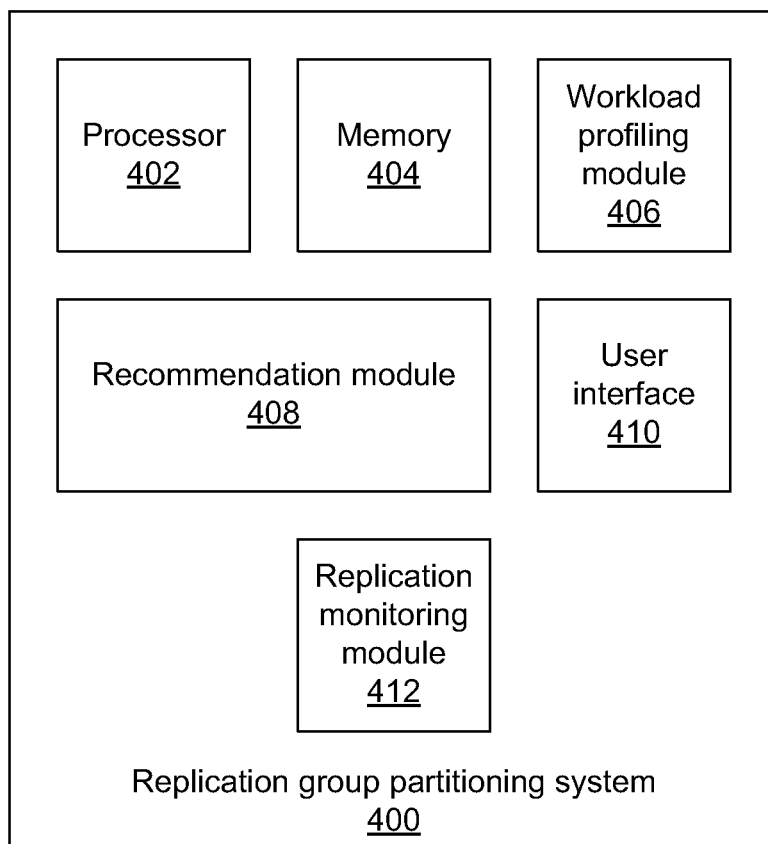
FIG. 4 is a diagram of a replication group partitioning system in accordance with the present principles.

Referring now to FIG. 4, a system 400 for replication group partitioning is shown. The system 400 may be a discrete device within data center A 102, but may also be implemented as separate functional components. For example, the system 400 may be split into a workload profiling part and a recommendation part. The system 400 includes a processor 402 and a memory 404. A workload profiling module 406 accesses logs stored in memory 404 and uses processor 402 to analyze the workloads in data center A 102. Recommendation module 408 uses processor 402 to generate recommended group partitions based on the output of the workload profiling module 406.

A user interface 410 allows a database administrator 122 to access the partitioning system 400 and review recommendations provided by the recommendation module 408. A replication monitoring module 412 continues to invoke workload profiling module 406 and recommendation module 408 to provide online revisions to the recommendations based on updated workload information.

Having described preferred embodiments of a system and method for replication group partitioning (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A system for replication group partitioning, comprising: a workload profiling module configured to analyze historical workload data for a plurality of data elements to identify and categorize one or more transaction patterns, each transaction pattern corresponding to a particular group of transactions that updates the same data elements and having a corresponding peak throughput;

a recommendation module comprising a hardware processor configured to generate a recommended partitioning of the plurality of data elements into one or more replication groups, based on the peak throughputs of the one or more transaction patterns, that are optimized toward a partitioning goal; and a change capture module configured to log transactions that involve the plurality of data elements in a first data center and to replicate the logged transactions in a second data center, where the replicated transactions are grouped according to the recommended partitioning.

2. The system of claim 1, wherein the recommendation module is further configured to receive revisions to the recommended partitioning of the plurality of data elements from a user interface and to generate a new recommended partitioning based on the received revisions.

3. The system of claim 1, wherein the plurality of data elements are tables or tablespaces in a database.

4. The system of claim 1, wherein the transaction patterns correspond to a group of transactions that updates a given sat of data elements.

5. The system of claim 1, wherein the partitioning goal comprises maintaining a predetermined affinity or separation between specific data elements.

6. The system of claim 1, further comprising a replication monitoring module configured to monitor online workload changes, wherein the recommendation module is further configured to generate a new recommended partitioning based on said online workload changes to maintain an optimized partitioning goal.

7. The system of claim 1, wherein the recommendation module is further configured to iteratively create partition groups by selecting data elements according to one or more selection criteria to generate the recommended partitioning.

8. The system of claim 1, wherein the recommendation module is further configured to exhaustively evaluate every possible partitioning of the plurality of data elements to generate the recommended partitioning.

9. A non-transitory computer readable storage medium comprising a computer readable program, wherein the computer readable program when executed on a computer causes the computer to perform the steps of:

analyzing historical workload data for a plurality of data elements with a processor to identify and categorize one or more transaction patterns, each transaction pattern corresponding to a particular group of transactions that updates the same data elements and having a corresponding peak throughput;

generating a recommended partitioning of the plurality of data elements into one or more replication groups, based on the peak throughputs of the one or more transaction patterns, that are optimized toward a partitioning goal; and logging transactions that involve the plurality of data elements in a first data center; and replicating the logged transactions in a second data center, where the replicated transactions are grouped according to the recommended partitioning.

* * * * *